May 31, 1955 J. E. BELL ET AL 2,709,499
AIR-INTAKES, MORE PARTICULARLY FOR AIRCRAFT
Filed March 6. 1953 3 Sheets-Sheet 3

INVENTORS
J. E. BELL &
B. A. PEASTER
BY
Wilkinson & Newkinney
ATTYS.

United States Patent Office 2,709,499
Patented May 31, 1955

2,709,499

AIR-INTAKES, MORE PARTICULARLY FOR AIRCRAFT

John Ernest Bell and Bertram Anthony Peaster, Bristol, England, assignors to The Bristol Aeroplane Company Limited, Bristol, England, a British company Application March 6, 1953, Serial No. 340,706

Claims priority, application Great Britain March 12, 1952

15 Claims. (Cl. 183—62)

This invention relates to air-intakes and concerns, more particularly, air-intakes for aircraft.

The object of this invention is to provide an improved retractable screen assemblage for preventing solid bodies from entering an air intake duct which will provide a high degree of protection and will have low aerodynamic losses both when the screen is extended across the air-intake duct and when it is retracted. The invention is intended more especially for application to the air-intakes of aircraft engines, but is not limited to this use.

The retractable screen assemblage according to the present invention comprises a screen hinged about an axis lying in a plane normal to the long axis of said duct adjacent a wall of said duct, an opening in said wall to permit swinging movement of the screen towards the mouth of the duct from an operative position, in which it extends transversely of the duct, to a retracted position in which it lies on the side of said wall remote from said duct, and vice versa, means carried by said screen to close part of said opening adjacent the axis of the screen, both when the screen is in its operative and retracted positions, further means to close at least a major part of the remainder of said opening, said further means being movable to a position allowing passage of said screen through said opening, first operating means to move said further closure means from, and return it to, its closed position, second operating means to move the screen to its operative or retracted position, and control means to control the operation of said first and second operating means so that said first operating means first operates to move said further closure means from its closed position, then said second operating means operates to move the screen to its operative or retracted position, and then said first operating means operates to move said further closure means to its closed position.

According to a feature of the present invention, the screen, in its operative position, may lie obliquely across the duct with its hinge remote from the mouth of the duct the screen being substantially inclined with respect to the long axis of the duct. By substantially inclined is to be understood inclined such that solid bodies which strike the screen are deflected sideways so that the shock of impact is reduced. Preferably the screen is curved, its concave face being directed towards the mouth of the duct when the screen is in its operative position. This arrangement tends to strengthen the screen and to ensure that the solid bodies are retained upon it as it is retracted through the opening in the duct wall and not allowed to fall off the screen into the duct.

According to another feature of the present invention said second closure means may comprise a pair of doors each hinged about an axis lying longitudinally of the duct, one hinge axis lying on each side of the screen, said doors being openable into the duct, and, when closed, to form a faired-continuation of the wall thereof.

An assemblage according to the invention of an air-intake duct of circular or annular cross-section may be provided with a plurality of sector shaped or annular-sector shaped screens each hinged about an axis lying beyond the outer peripheral wall of said duct, and said second closure means may be provided by a plurality of said pairs of doors, one pair for each sector shaped or annular sector shaped screen, and adjacent doors being connected to a common member movable to open or close each set of alternate doors, simultaneously.

One embodiment of the present invention will now be described by way of example, and with reference to the accompanying drawings whereof:

Figure 1:
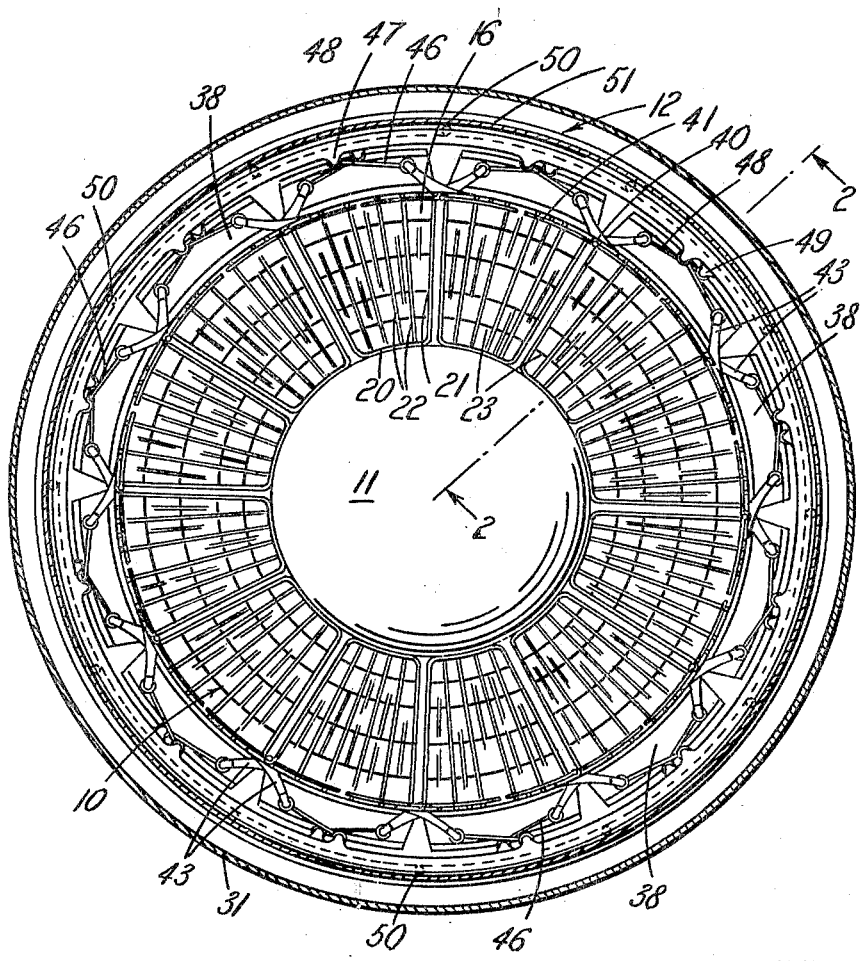
Figure 1 shows, in front across-sectional elevation, an annular air-intake for a gas turbine engine intended for aircraft propulsion having a screen assemblage in accordance with the present invention, certain of the mechanism being omitted for the sake of clarity, the doors being shown in their closed position, and the screens in their operative position.
Figure 2:
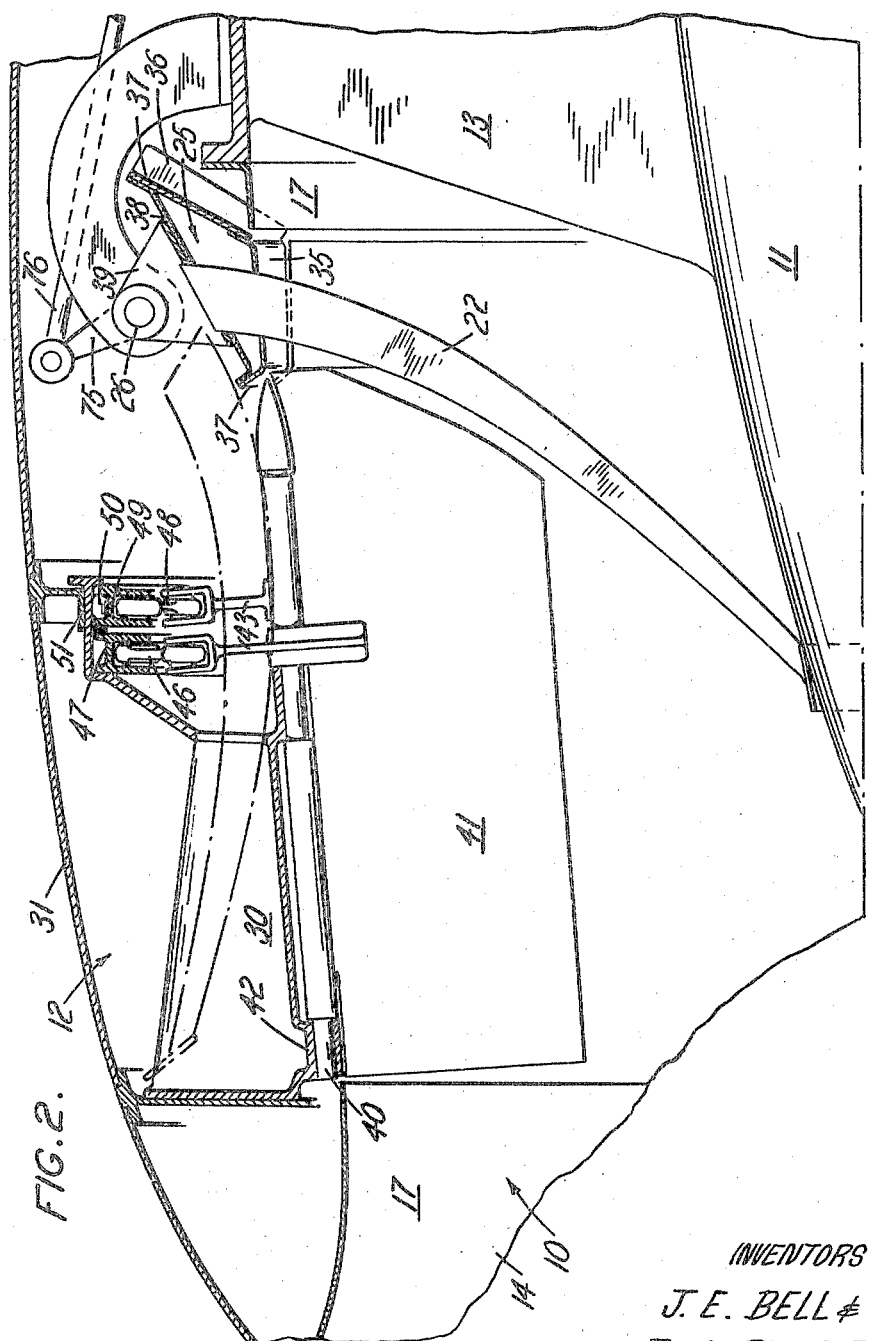
Figure 2 is a partial side elevation, in cross section on line 2—2 of Figure 1, but with the doors in an open position.
Figure 3:
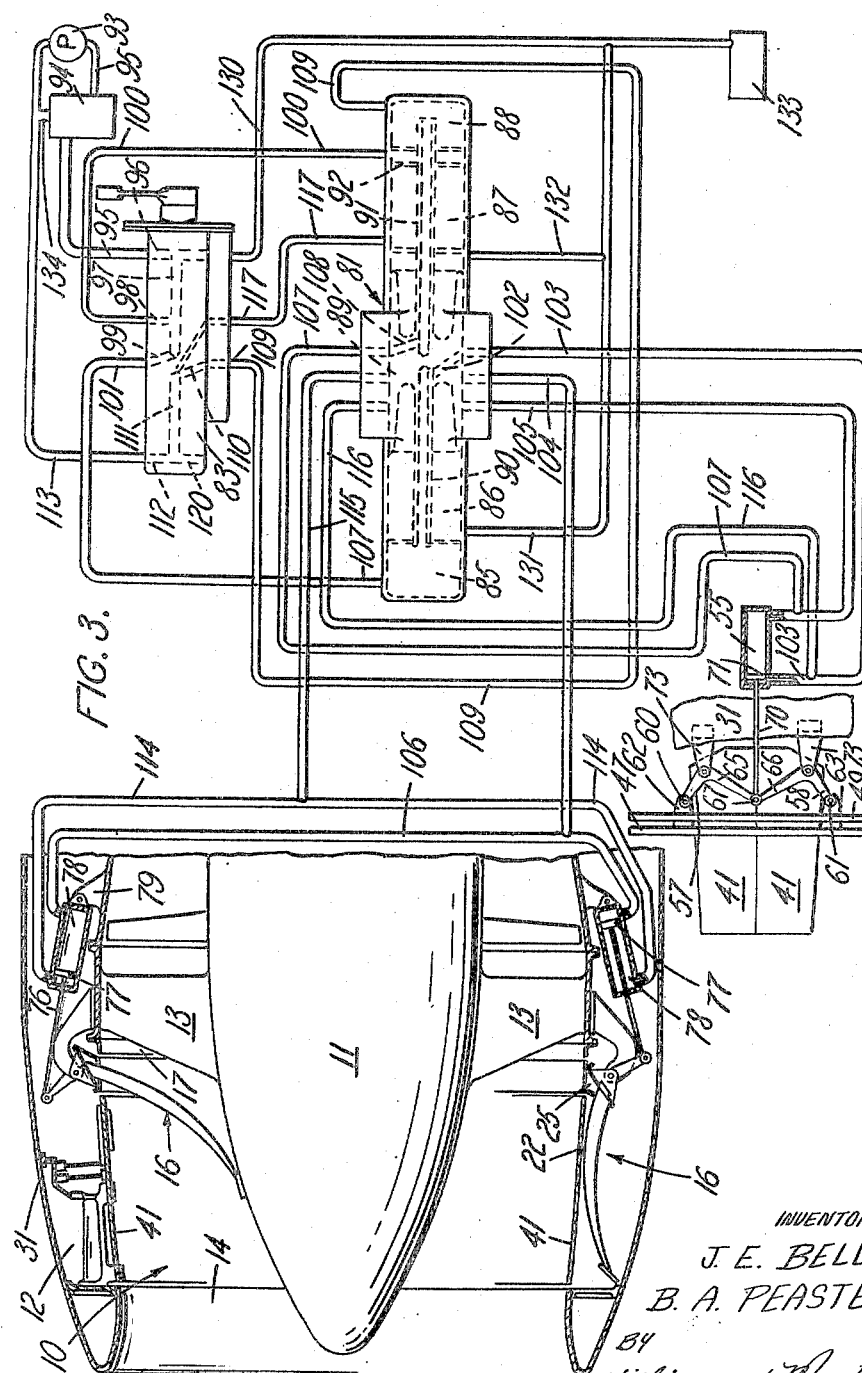
Figure 3 is a partially diagrammatic illustration of operating means for effecting the movements of the screens to and from their operative positions, and for opening and closing the doors, and control means to control the operation of said operating means.

Referring to the drawings, an annular air intake duct for a gas turbine engine is generally indicated at 10. The duct is formed between a central nose bullet 11 and an outer double-walled shroud generally indicated at 12, the two being connected together by spider arms 13 of streamlined section set back some little distance from the intake opening 14. Twelve screens are provided, these being generally indicated at 16. The screens 16, see Figure 1, are each, in front elevation, in the shape of an annular sector, the screens together protecting the cross-section of the duct 10 when in their operative position. In radial cross-sectional planes such as is shown in Figures 2 and 3 the screens are of curved shape starting approximately normally to the outer duct wall 17 a short distance forward of the spider arms 13 and curving forwardly towards the intake opening 14 as the nose bullet 11 is approached. Each screen 16 is composed of a frame 20 of strip material the width of which is a maximum adjacent the wall 17 and tapers towards the nose bullet 11, the section of the strip being preferably streamlined, at least as regards the radial side members 21 which across the duct 10. The frames 20 carry a number of radial bars 22, similar in shape to the members 21 and spaced at intervals according to the standard of protection required, the members 21 of adjacent frames 20 being spaced according to the same standard. Preferably the members 21 and bars 22 are interconnected by arcuate rods or wires 23 (see Figure 1) to prevent fluttering.

Adjacent the wall 17 each screen 16 is attached to a root structure, generally indicated at 25, journalled upon hinge pivots 26 the axis of which lies in a plane normal to the long axes of the duct and is transversed to the plane of symmetry of the screen and a short distance beyond the wall 17 so that by swinging forwardly and outwardly towards the intake 14, about the hinge pivots 26 the screen may be retracted into the space 30 between the walls 17 and 31 of the outer shroud 12. From a point to the rear of the screen root structure 25 to a point sufficiently far forward to allow passage of the screens the wall 17 has a circumferential opening normally closed by movable members as will now be described.

Each root structure 25 comprises a metal sheet 35 which in the operative position of its screen, forms part of the wall 17 forwardly and to the rear of the outer end of the screen, and a metal sheet 36 which, in the retracted position of the screen, moves into the position vacated by the sheet 35. The sheets 35, 36 join one another like a ridge roof with a sagging ridge, and their free edges 37 are joined by a stiffening sheet 38 which carries brackets 39 for the hinge pivots 26. Owing to the fact that the hinge axes of adjacent screens 16 are set at an angle to one another (the internal angle of a twelve-sided polygon) it follows that points on adjacent members 21 diverge from one another as the screens are retracted and that at some point forward of the outer ends of the screens there will be sufficient free space to accommodate longitudinally extending hinge pins 40 for doors 41 to close the remainder of the opening in the wall 17 through which the screens pass. The pins 40 are supported by structural members 42 attached to the wall 31 each carries a pair of sheet metal doors 41 which open inwardly to a radial face-to-face position in which they clear the members 21 of the screen frames 20 as the screens are swung upwardly into their retracted positions.

Each door 41 is provided with an operating lever 43 projecting into the hollow shroud 12, i. e. beyond the wall 17, the levers 43 of one set of alternate doors, lying in one plane, and the levers 43 of the other set of alternate doors lying in a plane spaced somewhat axially from the first. All the levers in the plane lying nearer the intake 14 are connected by links 46 to a ring 47 and all the levers lying in the other plane are connected by links 48 to a ring 49. The rings 47, 49 are supported by rollers 50 running on a circular track 51 supported by the outer wall 31 the rings surrounding the duct 10. To turn the rings 47, 49 a hydraulic jack 55, see Figure 3, is provided acting on the rings through bell-crank levers 57, 58 to ensure their equal and opposite movement so that all the doors are opened and closed simultaneously. The levers 57, 58 each have one arm pivotally connected as at 60 and 61 to lugs 62, 63 extending rearwardly from each of the rings 47, 49 respectively. The other arms 65, 66 of the levers 57, 58 are pivoted as at 67 to one end of a connecting rod 70 the other end of which carries the piston 71 of the jack 55. The levers 57, 58 are carried by brackets 73 attached to the wall 31 of the shroud 12.

In order that the screens 16 may be moved from their operative positions to their retracted positions and vice versa, each hinge pivot 26 carries a lever 75 projecting on the side thereof remote from its screen and connected at its free end to a rod 76 carrying a piston 77 of a hydraulic jack 78 arranged within the shroud 12 and pivoted to a lug 79 attached to the wall 17.

The hydraulic system of jacks 55 and 78 is controlled manually by the pilot by means of a single lever and is arranged to ensure the necessary sequence of movements, that is to say, when the screens 16 are to be moved to an operative position, the doors 41 are first opened, the screens then extended across the duct, and finally the doors 41 are reclosed. For retraction of the screens the doors 41 are first opened, the screens are retracted and the doors 41 then re-closed.

The hydraulic system will now be described. Referring to Figure 3, the system comprises an actuator valve generally indicated at 80, and a pressure oil operating cylinder generally indicated at 81. The valve 80 has two positions only separated by 180° of rotation of its rotatable plug 83. In the position shown in Figure 3 the valve is set for movement of the screens 16 from a retracted position to an operative position. When the plug 83 is rotated through 180° the valve 80 is then set for movement of the screen 16 from an operative to a retracted position.

The operating cylinder 81 has four fluid-tight compartments 85, 86, 87 and 88. The compartment 86 contains a sliding piston-like valve member 89 having hollow shafts 90, 91 which extend co-axially with the cylinder 81 one on each side of the member 89 and communicate with the compartments 85 and 88 respectively. Mounted on shaft 91 in compartment 87 is a servo-piston 92, the compartment 87 constituting a servo-cylinder for moving the member 89 in compartment 86.

Oil is delivered at a constant rate from a pump 93, via a high pressure relief valve 94, through a pipe 95 to a port 96 in the plug 83. The port 96 communicates with an axial bore 97 in the plug which in turn communicates with ports 98 and 99. Port 98 delivers oil to a pipe 100 which communicates with the servo-cylinder 87 on the side of the piston 92 remote from the member 89 and thereby moves the member 89 to the left as viewed in Figure 3. Port 99 delivers oil to a pipe 101 which communicates with compartment 85 and thence through shaft 90 to a port 102 in member 89.

In the position shown in Figure 3, the port 102 communicates first with a pipe 103 which delivers oil to the jack 55 on the side of the piston 71 to open all of the doors 41, and then with a pipe 104 which delivers oil via pipes 106 to all of the jacks 78 on the side of their pistons 77 to move the screens 16 to their operative positions, and then with a pipe 105 which delivers oil to the jack 55 on the other side of the piston 71 to re-reclose the doors 41.

The return flow of oil from the jack 55, when the piston 77 is moved to open the doors 41, is delivered via pipe 107, port 108 in member 89, hollow shaft 91, compartment 88, pipe 109, port 110 in plug 83, axial bore 111, port 112, and pipe 113 to the return side of pump 93.

The return flow of oil from the jacks 78, when the pistons 77 are moved to extend the screens 16 is delivered to the return side of the pumps 93 via pipes 114, pipe 115, port 108, shaft 91, compartment 88, pipe 109, port 110, axial bore 111, port 112 and pipe 113.

The return flow of oil from the jack 55, when the piston 71 is moved in a direction to re-close the doors 41, is delivered to the return side of the pump 93 via pipe 103, pipe 116, port 108, shaft 91, compartment 88, pipe 109, port 110, axial bore 111, port 112, and pipe 113.

The return flow of oil from the servo-cylinder 87 when the piston 9 is moved to the left in Figure 3, is delivered to the return side of the pump 93 via pipe 117, port 118 in plug 83, axial bore 111, port 112, and pipe 113.

It is to be understood that the rate of delivery of servo-oil to the cylinder 87, the inlet area to pipes 103, 104, 105 and the outlet area of pipes 107, 115, 116 is such as to allow each of the movements involved in the movement of the screens from their retracted to their operative positions to be completed before the ports 102 and 108 are moved out of communication with the pipes 103, 104, 105 and 107, 115, 116 respectively.

At the completion of the movements to move the screens 16 to their operative positions the member 89 will remain displaced to the left as viewed in Figure 3, with its ports 102, 108 beyond the mouths of the pipes 105, 116.

In order to retract the screens 16, the valve plug 83 is rotated through 180° so that port 119 communicates with pipe 95, port 98 communicates with pipe 117, port 99 communicates with pipe 109, port 120 communicates with pipe 113, port 110 communicates with pipe 101, and port 118 communicates with pipe 100. Servo oil then flows from pump 93 via pipe 95, port 119, axial bore 97, port 98, pipe 117 to servo cylinder 87 on the side of the piston 92 nearer the member 89 to move the member 89 to the right as viewed in Figure 3.

Oil is then first delivered via pipe 95, port 119, axial bore 97, port 99, pipe 109, compartment 88, hollow shaft 91, port 108, pipe 116 and pipe 103 to the jack 55 to open the doors 41, and then via pipe 95, port 119, axial bore 97, port 99, pipe 109, compartment 88, shaft 91, port 108, pipe 115, and pipes 114 to the jacks 78 to retract the screens 16, and then via pipe 95, port 119, axial bore 97, port 99, pipe 109, compartment 88, shaft 91, port 108, pipe 107 to jack 55 to re-close the doors 41

The return flow of oil from the jack 55, when the piston 71 is first moved to open the doors 41 for retraction of the screens 16 is delivered to the return side of the pump 93 via pipe 105, port 102, shaft 90, compartment 85, pipe 101, port 110, axial bore 111, port 120, and pipe 113.

The return flow of oil from the jacks 78 when their pistons 77 are moved in a direction to retract the screens 16 is delivered to the return side of the pump 93 via pipes 106, pipe 104, port 102, shaft 90, compartment 85, pipe 101, port 110, axial bore 111, port 120 and pipe 113.

The return flow of oil from the jack 55 when the piston 71 is moved in a direction to re-close the doors 41 after the screens 16 have been retracted, is delivered to the return side of the pump 93 via pipe 103, port 102, shaft 90, compartment 85, pipe 101, port 110, axial bore 111, port 120, and pipe 113.

The return flow of servo-oil from the cylinder 87 when the piston 92 is being displaced to the right as viewed in Figure 3 is delivered to the return side of the pump 93 via pipe 100, port 118, axial bore 111, port 120, and pipe 113.

At the completion of the movements to move the screens 16 to their retracted positions the member 89 will remain displaced to the right as viewed in Figure 3 with its ports 102, 108 beyond the mouths of the pipes 103, 107.

Pipes 130, 131, 132 drain escaped oil from the housing of valve 80, and the compartment 86, on each side of the member 89 respectively, and conduct the oil to a sump 133, from where it may be returned to the hydraulic circuit. Pipe 134 connects the high pressure relief valve to the return side of the pump.

The displacement of the ports 102 and 108 in the operating cylinder 81 is such that the correct sequence of movement of the doors 41 and the screens 16 when the screens are to be moved from a retracted position to an operative position, or vice versa, is entirely automatic following upon the movement of the actuator valve 80 from one or other of its positions.

The arrangement described allows practically the whole of the retraction opening in the wall 17 to be closed in both positions of the screens 16 except that, according to the amount of forward sweep desired for the screens and the space available in the double-walled shroud for suitably positioning the pivots 26 it may be necessary to cut away part of the rear corners of the doors 41 as shown in Figure 2 to allow these to clear the screens, so that small triangular openings are left in the wall 17. These openings can be avoided at the expense of some additional complication, as for example by arranging for the doors to move forwardly as they open or by increasing the number of doors and screens, or they may be closed by additional moving members.

Solid bodies caught by the screens will tend to work their way round to the bottom of the assemblage, either before or after retraction of the screens, and a suitable opening for their discharge may be provided in the outer wall 31 of the shroud 12. Such an opening preferably has a door which may be opened and closed in sequence with the other operations, for example as a final stage of the retraction operation.

We claim:

1. Retractable screen assemblage for an air-intake duct comprising a screen hinged about an axis lying in a plane normal to the long axis of said duct adjacent a wall of said duct, an opening in said wall to permit swinging movement of the screen towards the mouth of the duct from an operative position, in which it extends transversely of the duct, to a retracted position in which it lies on the side of said wall remote from said duct, and vice versa, means carried by said screen to close part of said opening adjacent the axis of the screen, both when the screen is in its operative and retracted positions, further means to close at least a major part of the remainder of said opening when the screen is in its operative and retracted positions, said further means being movable to an open position allowing passage of said screen through said opening toward its operative and retracted positions, first operating means to move said further closure means from its open to its closed position and vice versa, second operating means to move the screen from its operative position to its retracted position and vice versa, and control means to control the operation of said first and second operating means in sequence so that said first operating means first operates to move said further closure means from its closed position to its open position and, then said second operating means operates to move the screen from one of its said positions through said opening to the other of its said positions, and then said first operating means operates to move said further closure means to its closed position.

2. Retractable screen assemblage as claimed in claim 1, wherein the screen, in its operative position, lies obliquely across the duct with its hinge the more remote from the mouth of the duct the screen being substantially inclined with respect to the long axis of the duct.

3. Retractable screen assemblage as claimed in claim 2, wherein the screen is curved and has its concave face directed towards the mouth of the duct when the screen is in its operative position so that solid bodies are retained upon it when it is moved to its retracted position.

4. Retractable screen assemblage as claimed in claim 1 wherein said first closure means comprises a pair of metal sheets each of which is adapted to form a faired continuation of said wall adjacent said hinge and fore and aft thereof, the arrangement being that when the screen is in its operative position one of said sheets forms a faired continuation of said wall and the other of said sheets projects beyond said wall and out of said duct, and when the screen is in its retracted position said other sheet forms a faired continuation of said wall, and the first said sheet projects beyond said wall and out of said duct.

5. Retractable screen assemblage as claimed in claim 1 wherein said second closure means comprises a pair of doors each hinged about an axis lying longitudinally of the duct, one hinge axis lying on each side of the screen, said doors being openable into the duct, and, when closed, forming a faired-continuation of the wall thereof.

6. Retractable screen assemblage as claimed in claim 5, wherein said duct is of circular or annular cross-section, and a plurality of substantially sector shaped, or annular sector shaped screens are provided each hinged about an axis lying beyond the outer peripheral wall of said duct, and wherein the second closure means is provided by a plurality of said pairs of doors, one pair for each sector shaped or annular sector shaped screen.

7. Retractable screen assemblage as claimed in claim 6, wherein adjacent doors of adjacent pairs of doors are hinged about a common axis.

8. Retractable screen assemblage as claimed in claim 6 wherein said first operating means comprises, for each door, an operating lever which projects beyond the outer peripheral wall of the duct, the levers of each set of alternate doors being connected to a common member movable to open or close each set of alternate doors simultaneously.

9. Retractable screen assemblage as claimed in claim 8 wherein said members comprise rings which surround the duct and are spaced apart axially thereof.

10. Retractable screen assemblage as claimed in claim 9, wherein the first operating means comprises means to rotate said rings simultaneously in opposite directions thereby simultaneously opening or closing all of said doors.

11. Retractable screen assemblage as claimed in claim 10 wherein said means to rotate said rings includes a pair of bell-crank levers operated in common by one element of a hydraulic jack.

12. Retractable screen assemblage as claimed in claim 11, wherein the second operating means comprises a hydraulic jack for each screen.

13. Retractable screen assemblage as claimed in claim 12, wherein said control means comprises an operating cylinder containing a sliding valve member adapted to place, in consecutive sequence, a constant delivery oil pump in comunication with the hydraulic jack actuating said doors to open the doors, the hydraulic jacks actuating said screens to move said screens to an operative or retracted position, and then again the hydraulic jack actuating said doors to close said doors.

14. Retractable screen assemblage as claimed in claim 13 wherein said sliding valve member is moved by a servo-piston operating in a servo-cylinder supplied with oil from said pump.

15. Retractable screen assemblage as claimed in claim 14 wherein the hydraulic circuits between the pump and the operating and servo-cylinders contain a single rotatable two position valve which is adapted, in one position to initiate the retraction of the screens, and in the other position to initiate the movement of the screens to their operative position.

References Cited in the file of this patent
UNITED STATES PATENTS

| | | |
|---|---|---|
| 2,407,194 | Vokes | Sept. 3, 1946 |
| 2,618,358 | Newcomb | Nov. 18, 1952 |
| 2,652,131 | Kelly | Sept. 15, 1953 |